DATA TRANSMISSION SYSTEM

Filed Feb. 7, 1962 5 Sheets-Sheet 1

INVENTORS.
ROBERT E. STOFFELS
HORACE C. TALCOTT
DAVID P. ERDMANN
JAMES M. LUCE
EDWIN P. CRABBE
BY C. A. Gulbrandsen
ATTY.

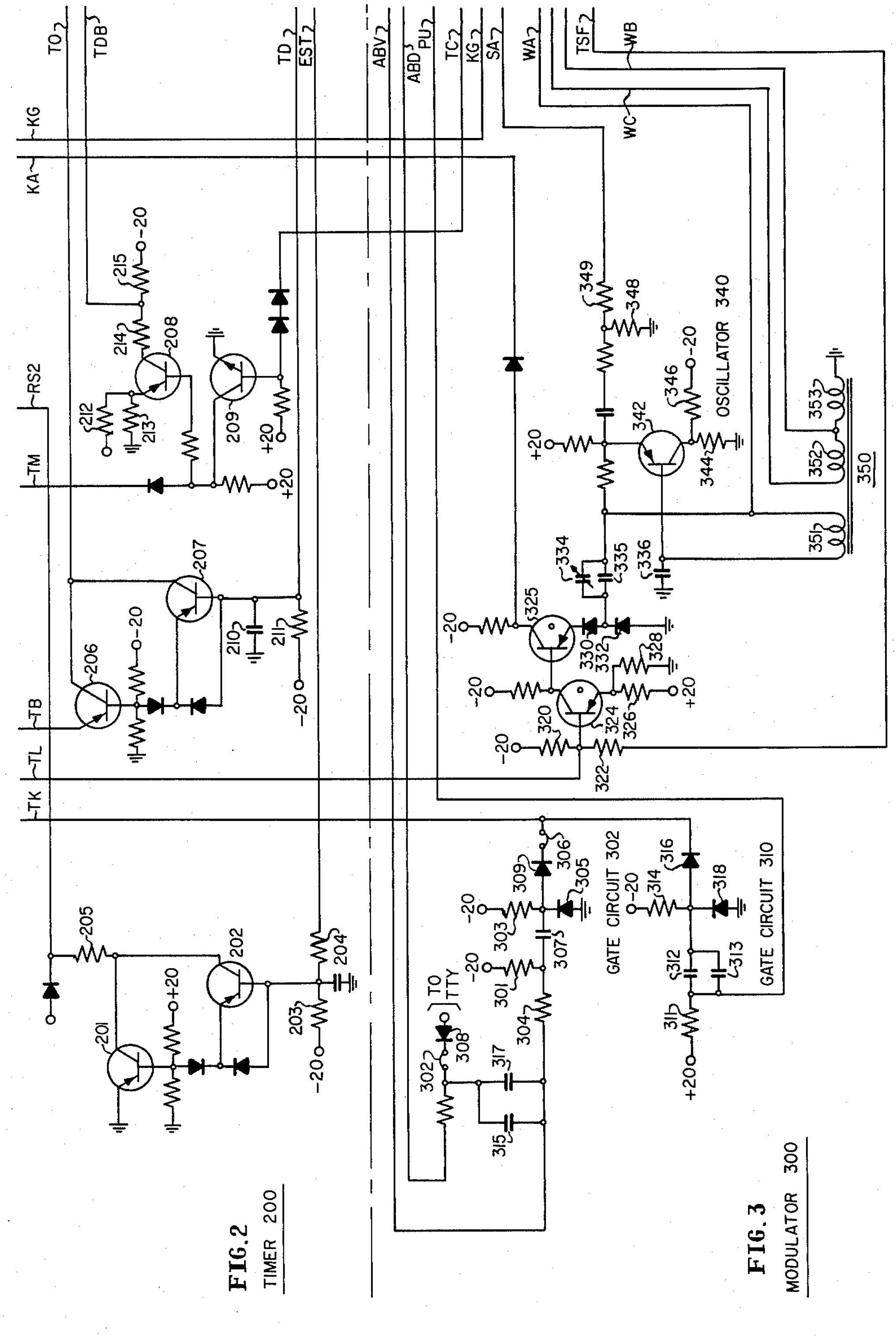
FIG. 2 TIMER 200, FIG. 3 MODULATOR 300

Sept. 14, 1965 R. E. STOFFELS ETAL 3,206,544

DATA TRANSMISSION SYSTEM

Filed Feb. 7, 1962 5 Sheets-Sheet 3

RELAY CONTROL 400

DATA TRANSMISSION SYSTEM

Filed Feb. 7, 1962 5 Sheets-Sheet 5

3,206,544

DATA TRANSMISSION SYSTEM

Robert E. Stoffels, Glen Ellyn Woods, Horace C. Talcott, Downers Grove, David P. Erdmann, Villa Park, James M. Luce, Chicago, and Edwin P. Crabbe, Rockford, Ill., assignors to Automatic Electric Laboratories, Inc., Northlake, Ill., a corporation of Delaware Filed Feb. 7, 1962, Ser. No. 171,712
2 Claims. (Cl. 178—3)

This invention relates to the transmission of signals representative of data over telephone lines, and more particularly, the invention relates to an arrangement for permitting connections between various data transmitting stations to be established automatically and for permitting the signals representative of data to be transmitted via telephone lines over the established connection.

Trends in long distance data transmission have created requirements which can be fulfilled only by a high efficiency, automatic communications network. In the past, teletypewriter service (TWX), for example, has been provided on a separately maintained, nationwide TWX system. Transmission of signals has been over privately leased telephone lines, and the connections between the teletypewriters (TTY) have been established by operators or by common TWX central office switching equipment. In any case, some manual supervision and control, or separate TWX switching equipment, is needed to establish a connection between the stations.

It is the principal object of this invention to provide data transmission equipment for direct dialing "calls" between stations and for transmitting signals representative of data which are compatible with the transmission characteristics of telephone communication channels.

While this invention is described as embodied in a TWX system it is to be understood that it is equally applicable to any type of data transmission system wherein direct current signalling is normally used for transmitting data.

In the present invention the TWX system is absorbed into the existing long distance, direct dial telephone network and the separately maintained TWX system is eliminated. All TWX "calls" are established by direct dialing, with all routing and processing of TWX traffic performed in a manner similar to customer dialed toll calls in the regular telephone exchange. The principal unit provided by this invention is the data set which contains all of the circuit elements for performing all of the functions associated with the logical control of the TTY data transmission and the conversion of direct current pulses and frequency modulated signals from one to another. The data set has isolated receive and transmit circuits providing for full duplex operation, and in order to eliminate any possible interference between these two circuits, such as feedback by resonance, the transmit and receive circuits always operate on two widely separated frequencies: F1 (1170±100 c.p.s.) and F2 (2125±100 c.p.s.). Transmission and reception may occur on either one of the two combinations. The circuit design eliminates choice and chance selection of frequencies however by establishing two modes of operation: the operating mode and the answering mode, and permitting the station originating a call to determine not only its own but also the called station's mode of operation. An originating station always will transmit on the F1 frequencies and receives F2 frequencies while the answering station receives the F1 frequencies and transmits on the F2 frequencies.

In addition to the data set a subset which is similar in appearance to a conventional pushbutton telephone is provided. The subset incorporates all of the operating controls such as a dial, pushbuttons with associated signal lamps, and a handset.

A feature of this invention is the timer arrangement which provides a number of timing intervals and which has only a single timing capacitor. The timer in conjunction with the relay control circuit of the data set provides the various time intervals by connecting various combinations of resistances into the timing circuitry with the single timing capacitor.

Another feature of this invention is the arrangement for generating the various frequencies involved. A single transformer having a number of windings forms a part of the tuned tank circuit of the oscillator, and the oscillator frequency is determined by connecting various combinations of the windings into the tuned tank circuit. In this respect, a further feature of the invention is that to shift the oscillator frequency from "MARK" to "SPACE" whether the station is transmitting F1 frequencies or F2 frequencies the same capacitance is shifted into the tuned tank circuit of the oscillator.

A further feature of this invention is the arrangement for regulating the oscillator which eliminates the need for temperature compensation.

Another feature of this invention is the arrangement for operating relays having low resistance windings, and yet avoiding the use of power transistors for doing so. The output of the transistor causes the relay to operate only its "X" contact to connect battery potential thereto to thus operate it fully. Resistance is included in the operating path to limit the current flow through the windings of the relays.

Another feature of this invention is the discriminator circuitry which establishes a narrow band of frequencies on each side of a nominal frequency in which a signal must fall in order to be interpreted as a "SPACE" or "MARK." As a result of this, better selectivity and therefore a lower error rate is provided; furthermore, the need for so-called "space-hold" circuitry is eliminated.

A further feature of the invention is the single hybrid coil or differential transformer used for coupling signals to and from the transmission line. The single hybrid coil permits using two unbalanced amplifiers and also aids in isolating harmonics from the receiving circuit.

The invention, both as to its organization and method of operation together with other objects and features thereof not specifically mentioned, will be better understood by reference to the following specification taken in conjunction with the accompanying drawings. In these drawings:

FIG. 2 is a schematic diagram of the timer circuit.

FIG. 3 is a schematic diagram of the modulator circuit.

Figure 1:
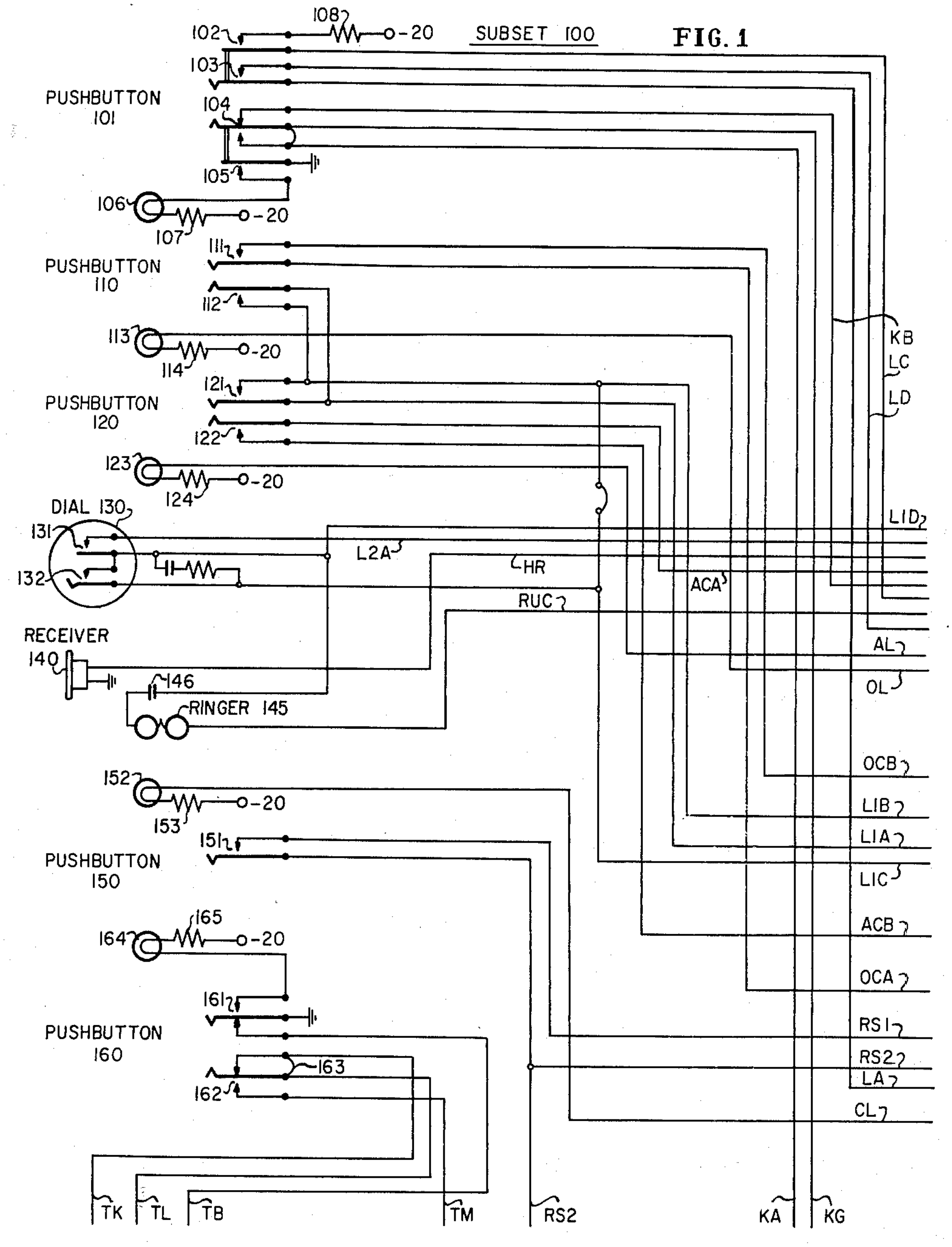
FIG. 1 is a schematic diagram of the subset.
Figure 9:
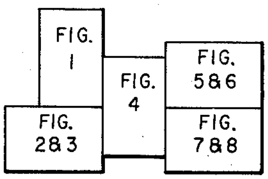
FIG. 9 shows the arrangement of FIGS. 1–8.
Figure 4:
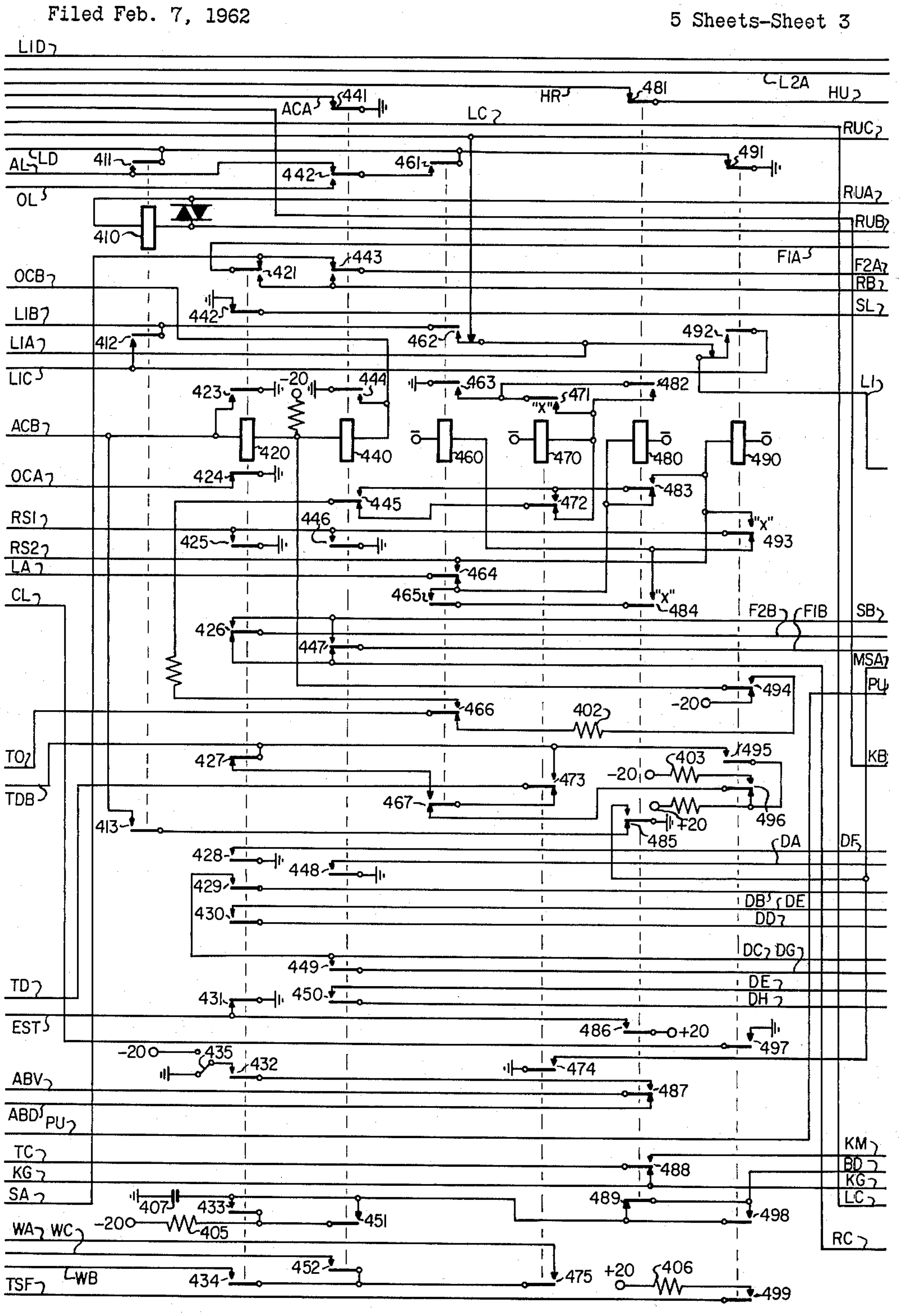
FIG. 4 is a schematic diagram of the relay control circuit.

Referring now to FIG. 1, the subset 100 which is shown schematically is similar in appearance to an ordinary key-type telephone instrument and comprises as its principal components a standard telephone dial 130 and ringer 145, five pushbuttons designated 101, 110, 120, 150 and 160 with their associated signal lamps 106, 113, 123, 152 and 164, respectively, and a handset (not shown) including a receiver 140 which is of the type generally found in a telephone instrument. The resistors 107, 114, 124, 153 and 165 are used to reduce the −20 volt potential to the voltage rating of the signal lamps. The subset is primarily distinguished from an ordinary telephone instrument in that it does not contain a transmitter, a transmission network or a hookswitch assembly.

The data set which performs all of the functions associated with the data transmission and the conversion of direct current pulses and frequency modulated signals from one to another comprises as its principal components, each of which will be more fully described in the description which follows, a timer 200, a modulator 300, a relay control circuit 400, a hybrid 500 a keyer 600, a discriminator 700 and a limiter 800.

In order to facilitate the explanation and to avoid confusion, the basic operation of each of these circuits will be described separately. In this connection, when reference is made to a particular component the figure in which the component may be found may be determined by the first digit of its reference character, that is, for example, the modulator 300 may be found in FIGURE 3.

TIMER 200

The purpose of the timer 200 is to operate the relays 420, 440, 460, 470, and 480 and 490 at the proper time and in the proper sequence. The last-mentioned relays, however, perform the necessary logic so that the timer 200 can always control the proper relay at the proper time.

The basic timer circuit consists of capacitor 210, resistor 211, and transistors 206 and 207, providing a time of 1.2 to 1.7 seconds. A time interval of 850 to 1200 milliseconds (ms.) may be selected by the operation of various relays to connect the resistor 403 in parallel with the resistor 211. A further time interval of 500 to 800 ms. is provided when transistors 208 and 209 and resistor 215 are used in conjunction with the basic timer circuit described above.

It may be noted that in each case a range of time is specified for the time intervals. Any specific time interval may be selected within this range by selecting the resistors 211, 403 and 215 with appropriate values.

It may also be noted that only the single timing capacitor 210 is used for each of these various time intervals. The precise time interval required for proper operation may be easily adjusted then since only capacitor 210 in combination with the previously mentioned resistors need be adjusted.

Transistors 201 and 202, capacitor 204 and resistor 203 form an additional timer circuit which provides a timing interval of 8 seconds to provide a time out if the distant station malfunctions.

The operation of the time 200 is performing these timing intervals may be described as follows. At normal, resistor 211 and resistor 404 via lead TD maintain slightly less than +20 volts on capacitor 210. During operation, prior to a timing sequence, a potential of approximately 0 volts appears on lead TC, maintaining 0 bias on NPN transistor 209 allowing it to conduct to maintain about 0 volts at its collector. The PNP transistor 208 is direct coupled to transistor 209, and its emitter is connected to approximately +15 volts with voltage divider resistors 212 and 213. The 0 volts present on the base electrode allow 15 volts of saturation bias to hold transistor 208 in conduction, presenting its emitter potential of about +15 volts to the collector, and via leads TDB and TD to capacitor 210.

In either case, the +20 or the +15 volts on capacitor 210 maintains cut off bias on PNP transistor 207, which, in turn, keeps PNP transistor 206 cut off. Transistors 206 and 207 are connected in a modified Darlington compound connection to produce a combined resultant beta of approximately 900.

The basic timing interval of 1.2 to 1.7 seconds occurs when lead TD is opened, permitting capacitor 210 to discharge through resistor 211. After approximately 1.5 seconds the potential on the positive side of capacitor

210 drops to 0 volts, allowing transistor 207 and, in turn, transistor 206 to conduct. The collector current of transistor 206 via lead T0 causes one or the other of the relays 470, 480 or 490, depending upon which mode of operation has been established, to operate its "X" contact. These relays upon operating then lock up to ground. The relays 470, 480 and 490 are all relays having low resistance windings (approximately 170 ohms) and the need for a power transistor to operate these relays is avoided by operating the relays to first close its "X" contacts to close full voltage to operate the relay fully. The resistor 401 is a current limiting resistor to protect the windings of the relays 470, 480, 490.

The second timing interval previously mentioned occurs when relay 490 is operated and relays 460 and 470 are restored, putting the resistor 403 in parallel with resistor 211. The time constant is then less and produces a discharge time for capacitor 210 of 850 to 1200 ms.

The third timing sequence previously referred to involves resistor 215. The input on lead TC changes from approximately 0 volts to approximately −20 volts, applying cut off bias between the emitter and base of the NPN transistor 209. The collector voltage rises to about +20 volts, cutting off transistor 208. Since there is no longer a positive potential on the collector of transistor 208, capacitor 210 discharges through resistors 211 and 215 in parallel producing a timing intervals of 500 to 800 ms.

Transistors 201 and 202, capacitor 204 and resistor 203 comprises another timing circuit identical to the basic timing circuit except that the capacitor 204 in conjunction with resistor 203 provides a time intervals of approximately 8 seconds. This circuit operates in the same manner as previously described for transistors 206 and 207, except that approximately 8 seconds is required to discharge capacitor 204 until transistor 202 conducts.

Resistor 404 provides a very fast charge path for capacitor 210 where one timing sequence is followed very closely by another.

MODULATOR 300

The modulator 300 comprises as its principal components the oscillator 340, the frequency shift circuitry including transistors 324 and 325 and the gate circuits 302 and 310 for shifting the oscillator frequency, and for switching the keyer 600 from MARK to SPACE.

The oscillator 340 comprises transistor 342 connected as a modified Hartley oscillator using the transformer 350 and capacitor 336 as a tuned tank circuit. The output frequency of oscillator 340 is established at the F1 or F2 frequencies by selectively connecting the coils 351–353 in the tuned tank circuit. That is, for example, when relays 440 and 470 are operated, lead WA is connected to lead WC so as to include coils 351, 352 and 353 in the tank circuit to select the $F1_m$ frequency (1270 c.p.s.). When relays 420 and 470 are operated, lead WA is connected to lead WB to include only the coils 351 and 353 in the tank circuit to select the $F2_m$ frequency (2225 c.p.s.). Oscillations normally occur at the MARK frequencies. Transistors 324 and 325 act as a switch and connect capacitors 334 and 335 in and out of the tuned tank circuit by connecting them to ground through diode 332. In so doing, the output frequency is reduced 200 c.p.s. to the SPACE frequencies, $F1_s=1070$ c.p.s. and $F2_s=2025$ c.p.s. It may be noted that the oscillator frequency is shifted from MARK to SPACE by connecting the same capacitors, capacitors 334 and 335, in and out of the tank circuit whether the oscillator 340 is generating either the F1 or F2 frequencies.

Resistors 344 and 346 form a voltage divider and control the regulation of oscillator 340 by holding the collector of transistor 342 at a fixed potential. Controlling the regulation in this manner rather than with, for example, a non-linear device, eliminates the need for an additional temperature compensating network.

A frequency stability of ±1 c.p.s. is maintained over the temperature range 0° C. to +55° C. by matching the positive temperature coefficient of permeability of transformer 350 with the negative temperature coefficient of capacitance of capacitor 336.

Resistors 348 and 349 are a fixed pad which reduces the output of the oscillator 340 to provide a maximum of dbm to the line.

Shifting the frequency of oscillator 340 from the MARK frequency ($F1_m$ or $F2_m$) to the SPACE frequency ($F1_s$ or $F2_s$) is accomplished in the following manner. Voltage divider resistors 326 and 328 place approximately +5 volts on the emitter of transistor 324. The base of transistor 324 is returned to ground via leads TL and TK and diodes 316 and 318, in the presence of −20 volts through resistor 134 to keep them conducting, and transistor 324 is therefore conducting when the circuit is quiescent, causing the +5 volts to appear at its collector. Transistor 325 is kept cut off by the presence of this +5 volts on its base electrode, with no resulting current flow through diodes 330 and 332, isolating capacitors 334 and 335 from ground.

The TTY SEND and BREAK contacts are normally closed, holding ground on lead PU. When the SEND contacts open, the ground is removed and a positive pulse from +20 volts through resistor 311, differentiated by capacitors 312 and 313, appears at the base of transistor 324, cutting it off. Resistor 314 reduces the fall time of the pulse and makes it appear more like a square wave, and diode 318 clamps this pulse to a zero base line. When transistor 324 is cut off, the negative voltage at its collector electrode allows transistor 325 to conduct causing current flow through diodes 330 and 332, connecting capacitors 334 and 335 to ground. This decreases the oscillator frequency 200 c.p.s. to the SPACE frequency (1070 or 2025 c.p.s.).

When the SEND contacts reopen, a negative, differentiated pulse is applied to the base of transistor 324, allowing it to conduct, cutting off transistor 325 and thereby disconnecting capacitors 334 and 335 from ground, and restoring the MARK frequency (1270 or 2225 c.p.s.).

During TTY message sending, capacitors 312 and 313 charge only partially, simulating a short circuit and transistor 324 follows the impulses from the SEND contacts.

When the TTY BREAK contacts are opened for at least 400 ms., capacitors 312 and 313 are allowed to charge more fully and after about 300 ms., transistor 324 conducts and transistor 325 cuts off to provide a MARK condition. Thus, a SPACE condition is sent to the distant station for about 300 ms. which is interpreted as an interruption.

Two modes of ANSWER-BACK operation are provided and either may be employed depending upon the teletypewriter model which is being used. If letter "V" ANSWER-BACK is desired the strap 306 is connected. When this mode of operation is being used the answering station upon receiving a MARK signal from the originating station and operating relay 480 to ground lead ABV, applies a differentiated positive pulse to the base of transistor 324, generating a SPACE condition as previously described. This time however, diodes 305 and 309, capacitor 307, resistors 301, 303 and 304 form the pulse.

Capacitors 312 and 313 reverse their charge potential through resistor 320, and after 25 ms. the charging current decreases enough so that negative current through resistor 320 allows transistor 324 to conduct, restoring the MARK condition as previously described. The 25 ms. of SPACE frequency is equivalent to two SPACE pulses which is the TTY code for "V" (start pulse followed by one SPACE pulse). Diodes 309 and 316 form an OR gate to prevent interaction between the sending and the "V" Answer-Back circuitry.

If DRUM ANSWER-BACK operation (the drum is a device that automatically sends a sequence of approximately 20 characters) is desired the strap 306 should not be used but rather the strap 302 to connect through diode 308 to the TTY and the strap 435 should be changed to remove the ground and to connect to the −20 volts potential. In this case, when relay 480 operates a negative differentiated pulse is sent over lead ABV, strap 302 and diode 308 to the TTY to energize the DRUM ANSWER-BACK mechanism. As the DRUM rotates, the station identification is sent back via the SEND contacts. Capacitors 315 and 317 charge after one cycle of the DRUM, interrupting the current flow over the strap 302 and diode 308 to the TTY, thus the station identification is sent only once.

The operation of the equipment in clearing may be described as follows. Relay 490, when operated, closes make contact 499 placing a positive potential on lead TSF and hence to the base of transistor 324, cutting it off to send a SPACE tone, as previously described, as long as relay 490 remains operated. This is to restore the distant data transmission equipment to its on-hook condition at the end of a call by sending a SPACE frequency over the line for about two seconds. The timer 200 restores relay 490 after the two second interval.

HYBRID 500

Figures 5, 6:
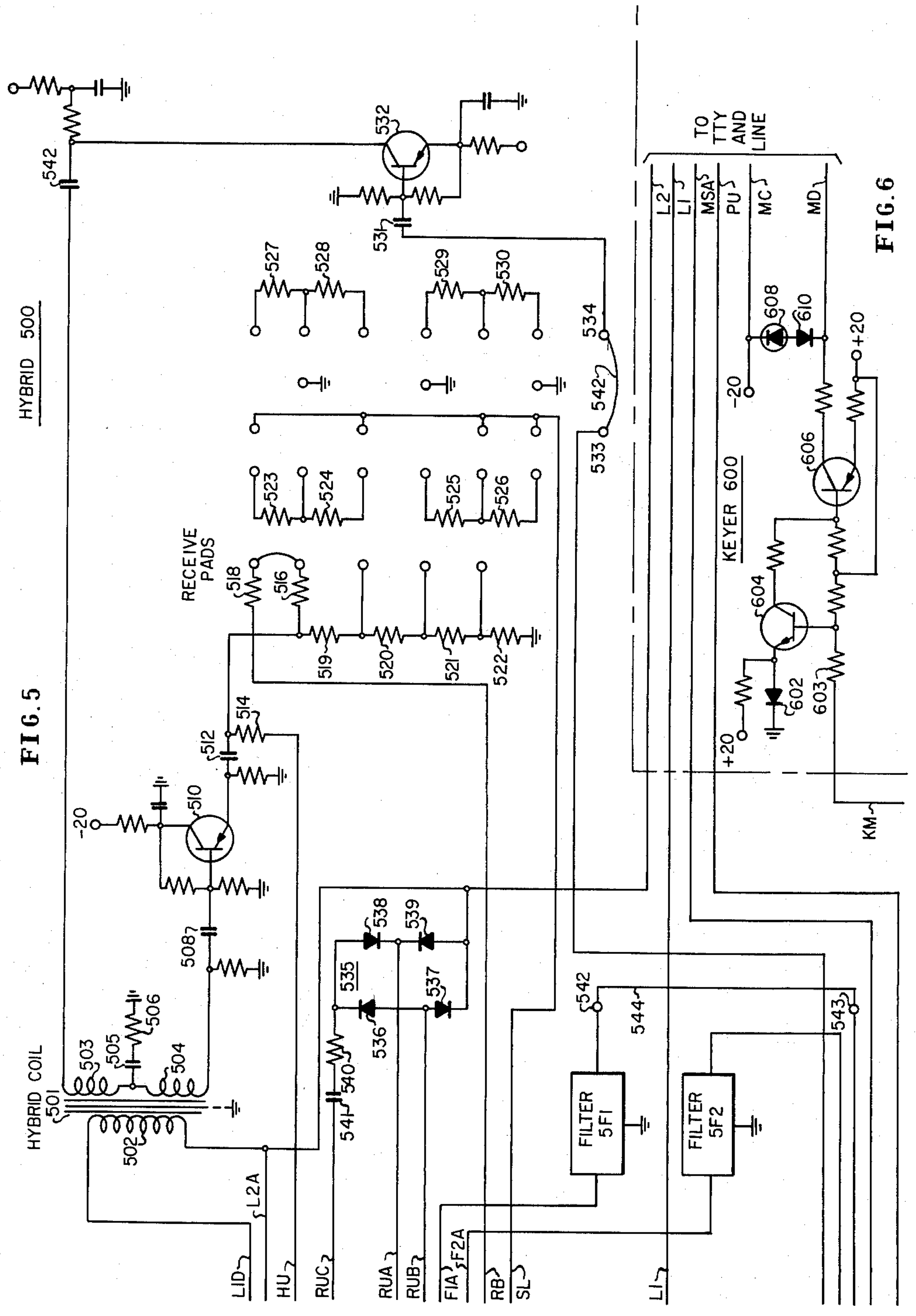
FIG. 5 is a schematic diagram of the hybrid. Also shown is the full-wave bridge rectifier for rectifying the ringing current and the filters.
FIG. 6 is a schematic diagram of the keyer.
Figures 7, 8:
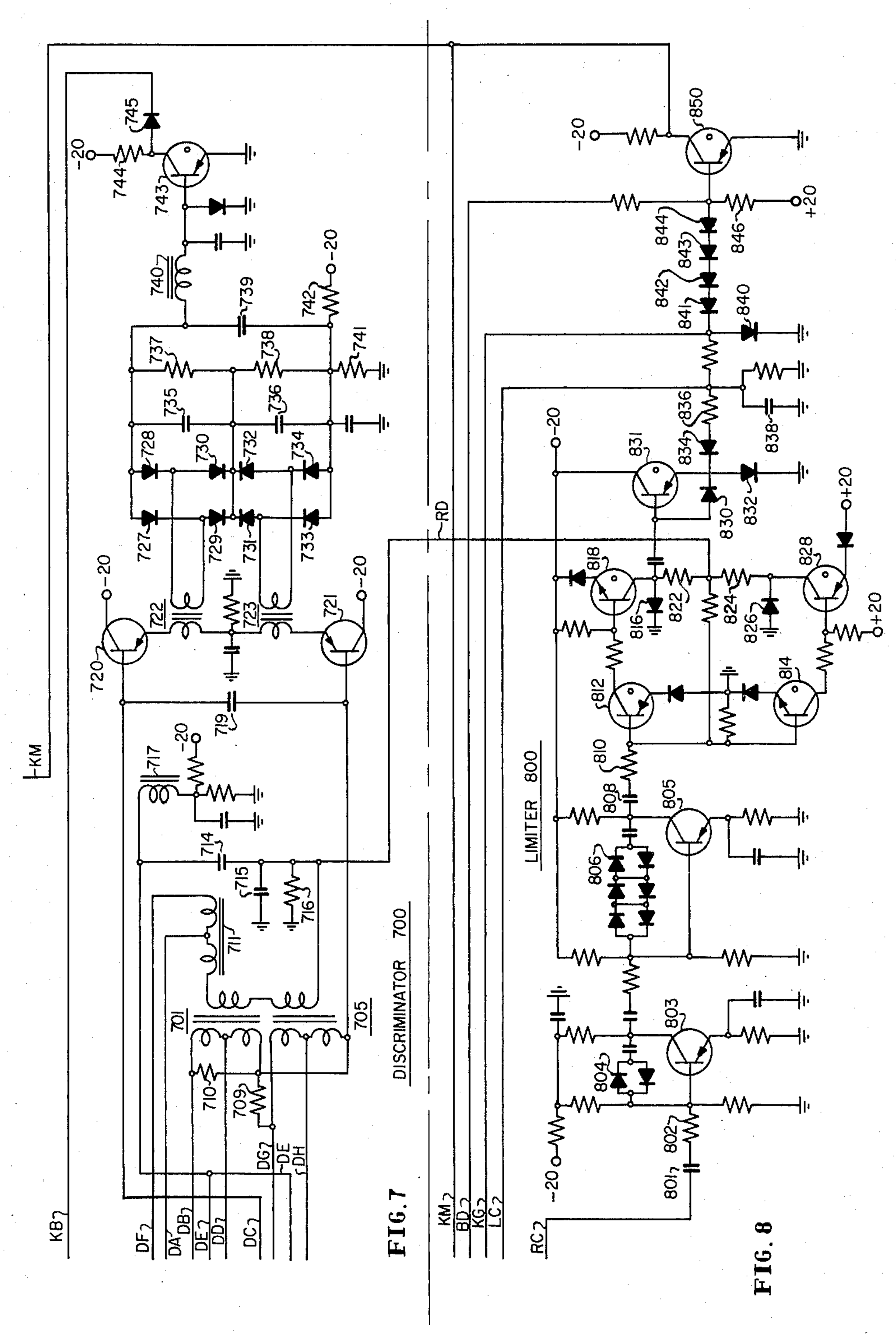
FIG. 7 is a schematic diagram of the discriminator.
FIG. 8 is a schematic diagram of the limiter.

The hybrid 500 contains the amplifiers and attenuating pads for controlling the sending and receiving levels to and from the hybrid coil 501. Also shown in FIG. 5 along with the hybrid 500 are the filters 5F1 and 5F2 and the full-wave diode bridge 535 for operating the "ring up" relay 410.

The receiving circuit is comprised of the receive winding 504 of the hybrid coil 501, transistor 510 which is a common collector amplifier and which maintains a 2500 ohm termination for the receiving winding 504 of the hybrid coil 501 and also drives the subset receiver 140 and receiving filter. Power gain from the line to the receiver is 6 db. Resistors 518–522 comprise resistance pads to attenuate the output to the filters at 4, 8, and 12 db. Output impedance is maintained at 2500 ohms for terminating the filters.

The sending circuit is comprised of the transistor 532 which is a common emitter buffer amplifier between the oscillator 340 and the sending filter. Input and output impedances are 2500 ohms, and a gain of about 19 db between matched terminations is provided. L-type resistance pads are provided to attenuate the sending level in 2 db steps from 2 to 14 db.

The hybrid coil 501 comprising the primary winding 502, the send winding 503 and the receive winding 504 is a single coil hybrid or differential transformer which allows the two unbalanced amplifiers 510 and 532 to be used. The send amplifier 532 is very carefully designed not to generate second harmonics of F1 to prevent them from being introduced in the receive circuit. The hybrid coil 501 also aids in separating any harmonics which may be present from entering the receive circuit.

The signals received from the telephone line (lines L1 and L2) flow through the primary winding 502 of hybrid coil 501 are induced in the receive winding 504 and passed through the capacitor 508 to the base of transistor amplifier 510. The amplified output through capacitor 512 and resistor 514 drives the subset receiver 140 via lead HU, and is also connected to the proper filter 5F1 or 5F2 via the receiving pads and lead RB. As soon as a valid connection is established, relay 480 operates and opens the receiver circuit at contact 481. The proper receiving level may be adjusted by strapping the terminals A through E in the manner well-known in the art.

The signals received, if this is an "originating" station, pass through contact 433 of relay 440, through filter 5F2, lead F2B, contact 426 of relay 420, lead RC to the input of the limiter 800. If this is an "answering" station, the received signal passes through contact 421 of relay 420, lead F1A, filter 5F1, lead F1B, contact 447 of relay 440, lead RC to the input of the limiter 800.

Signals which are to be transmitted to the distant station originate in the modulator 300 and are passed via the output lead SA of oscillator 340 to the proper filter, lead SB, the jumper cable 542, capacitor 531 to the base of the transistor amplifier 532. The output of transistor amplifier 532 passes through capacitor 542 and the send winding 503 of the hybrid coil 501 and is induced in the primary winding 502 to the telephone line. It may be noted for the purpose of this disclosure that the SEND pads are completely bypassed by connecting the terminals 533 and 534 by means of the jumper cable 542.

The transmitted signals, if this is an originating station, flow via lead SA through break contact 421 of relay 420 (relay 440 is operated), lead F1A, filter 5F1, additional SEND pads via terminals 542 and 543 which may be strapped in the manner well-known in the art, lead F1B, make contact 447, lead SB, strap 542, send amplifier 532, capacitor 542, to the send winding 503 of the hybrid coil 501. These additional pads are associated with filter 5F1 only and are used to equalize the F1 and F2 sending levels when the 2300 c.p.s. loss of the line is appreciably greater than the loss at 1000 c.p.s.

If this is an answering station, relay 420 is operated and the transmitted signals on lead SA pass through break contact 443, lead F2A, filter 5F2, lead F2B, make contact 426, lead SB, strap 542, capacitor 531, send amplifier 532, capacitor 542, to the send winding 503 of hybrid coil 501.

The diode bridge 535 comprising the diodes 536–539 provides automatic answering. Ringing current from the telephone line passes through break contact 462, lead RUC, capacitor 541, resistor 542, the full-wave diode bridge rectifier 535, is rectified, and sent over leads RUA and RUB to operate the "ring-up" relay 410.

LIMITER 800

The limiter 800 contains the amplifier which drives the discriminator 700, and the logic gate with a transistor switch which controls the keyer 600. Limiting action is provided by a two-stage D.C. coupled, push-pull, saturating transistor switching circuit, using an NPN-PNP complementary-symmetrical configuration. In operation the output is alternately connected to equal negative and positive potentials which are closely controlled by a regulated power supply. The limiter thus operates as a digital circuit, triggering to the full limiting state for all input signals at or above the threshold sensitivity.

A two-stage pre-amplifier provides the additional gain necessary to match the sensitivity requirements of the system. Its output is limited to an arbitrary value somewhat above that required to trigger the D.C. limiter stages.

The keying logic gate combines the information from the limiter, the discriminator, and the modulator to control the keyer.

Transistors 812, 814, 818 and 820 comprise the two-stage D.C. coupled, push-pull, saturating transistor switching circuit and the transistors 803 and 805 form the two-stage pre-amplifier. Tone signals above 5 mv. are amplified and limited to essentially a 40 volt peak to peak square wave. The fundamental frequency is attenuated rapidly as the input signal level falls below 5 mv. due to crossover distortion in the push-pull output amplifiers transistors 818 and 828. At 2 mv. the fundamental is negligible and there is no significant output to the discriminator 700 or to the logic circuit. Transistors 831 and 850 comprise the logic gate. Transistor 850 is a common emitter switch used to drive the keyer 600, and to start and reset the SPACE timing circuit in the timer 200. When this gate is opened a MARK signal is sent to the keyer 600. The gate can be closed to send a SPACE signal by either of two inhibit type inputs which are connected to the outputs of the discriminator 700 and the sending logic in the modulator 300.

The gate enabling circuit contains transistor 831. The storage capacitor 838 holds a MARK condition for about the length of one TTY pulse period whenever the MARK tone signal is removed at the input of the limiter amplifier. A SPACE condition is then sent to the keyer 600 and timer 200. This feature covers short drop outs which may occur in the telephone transmission network.

The operation of the limiter circuit may be described in the following manner. The tone signals received on lead RC via capacitor 801 and resistor 802 are amplified by cascaded transistors 803 and 805, which are common emitter amplifiers with diodes 804 and 806 in the collector to base circuits, respectively, to provide negative feedback at predetermined signal levels to limit the signal wave peaks to a fixed value. This eliminates amplitude modulation due to noise as well as amplitude variations due to different transmission circuit losses. The signal at the collector of transistor 805 is essentially a square wave and is applied via capacitor 808 and resistor 810 to the input of the two-state D.C. coupled, push-pull, saturating transistor switching circuit composed of transistors 812, 814, 818 and 828. The negative peaks allow transistors 812 and 818 to conduct to clamp −20 volts through resistor 822 to the output lead RD. The positive peaks allow transistors 814 and 828 to conduct to clamp +20 volts through resistor 824 to the output lead RD. Since operation is on a complementary basis and only one transistor of a symmetrical pair can be conducting at a time, a 40 volt peak to peak square wave at the tone frequency appears at the collectors of transistors 818 and 828. Diodes 816 and 826 protect transistors 818 and 828, respectively, by limiting the maximum collector to emitter voltage to about 20 volts. Resistors 822 and 824 control the output to the discriminator 700 at about 6 ma.

Transistor 831 charges capacitor 838 through diode 834 to about −19 volts from the output of transistor 818 whenever a tone signal is being received. Diodes 830 and 832 form a D.C. restorer which allows capacitor 820 to charge and discharge to the full peak to peak value of the negative half-wave output of transistor 818. The attack time of capacitor 838 is approximately 100 ms.

Transistor 850 is normally cut off by the potential developed across diodes 841–844 from the current through resistor 846. Its cut off and conducting states correspond to SPACE and MARK, respectively. The output on lead KM is used to drive the keyer 600 and to start and reset the SPACE timing circuit in the timer 200.

The −19 volt potential on capacitor 838 establishes a MARK condition by enabling the gate to transistor 850 and the timer 200 via lead KG. Inhibit inputs from the discriminator 700 and the modulator 300 via lead KG close the gate when receiving or sending a SPACE frequency. Thus the keyer logic is as follows:

(1) (Tone) (Discriminator Mark+Modulator Mark) =Keyer Mark
(2) (Tone) (Discriminator Space+Modulator Space) =Keyer Space
(3) No Tone=Keyer Space Upon loss of tone, the charge on capacitor 838 enables the gate for about 20 ms. before cutting off transistor 850 and switching to SPACE. This feature prevents short drop outs of the transmission circuit from effecting the keyer MARK state.

Transistor 850 can also be turned on to the MARK state from lead BD. When either relay 420 or 440 operates, −20 volts is extended through resistor 405 and either contact 433 of relay 420 or contact 451 of relay 440 to lead BD and current flow through resistor 846 allows transistor 850 to conduct. When clearing the equipment at the end of a call, relay 490 connects lead BD to the capacitor 407 for a few seconds. The discharge current of capacitor 407 holds transistor 850 in the MARK condition for about 15 seconds to prevent the TTY from running open while the motor coasts to a stop.

DISCRIMINATOR

The discriminator 700 contains a frequency discriminator, amplitude detectors, and a logic switch. Transformers 701 and 705 and choke coil 717 comprise a single-tuned, phase discriminator with relay switching to select the F1 or F2 band. Transistors 720 and 721 are common collector amplifiers on each side of the discriminator output. Diodes 727–734 comprise two full-wave, bridge, diode detectors. Transistor 743 is a common emitter switch providing a two level logical output. The digital output responds to a frequency shift with a delay of less than 100 microseconds. Capacitors 715 and 719 are resonant with the primary and secondary self-inductances respectively of transformer coils 711, 701 and 705. Relays 420 and 440 select the resonant frequency which is the center frequency of either the F1 bank or the F2 band; 1170 c.p.s. or 2125 c.p.s., respectively. At resonance the induced voltages on either side of the secondary center tap are shifted ±90° from the primary voltage, which is added to the secondary voltage through capacitor 714. The voltages at the base electrodes of transistors 720 and 721 are the vector sum of the primary reference voltage and each of the secondary voltages, with respect to ground. At frequencies off resonance the phase relation of the secondary voltages to the primary voltage shift in opposite directions so that unequal voltages appear at the base electrodes of transistors 720 and 721. Below resonance the voltage at transistor 720 exceeds that of the transistor 721, and vice versa. The coupling between the primary and secondary is small so that a bandpass response is obtained, and frequencies below the SPACE frequency (1070 or 2025) and frequencies above the MARK frequency (1270 or 2225) are attenuated. Thus, the voltage at transistors 720 and 721 are alternately maximum and minimum as the frequency shifts between MARK and SPACE.

Transistors 720 and 721 amplify the secondary currents which are coupled to the diode bridge rectifiers (diodes 727–730 and 731–734) through transformer windings 722 and 723. The resulting D.C. voltage is filtered by capacitors 735 and 736 and is developed across resistors 737 and 738. The voltages are connected in series opposing so that the difference appears at the base electrode of transistor 743 via filter 740.

With the phasing shown, a frequency shift toward MARK develops a positive voltage at transistor 743, and a shift towards SPACE develops a negative voltage. Forward bias developed at voltage divider resistors 741 and 742 is set to allow transistor 743 to conduct at all frequencies except those approximately 30 c.p.s. on either side of a MARK frequency. This range allows for a clearer shift in the telephone transmission network. Resistors 709, 710 and 716 control the Q of the tuned circuits to the proper value at F1 and F2.

Negligible delay in response to a frequency shift is accomplished by the transistor circuitry. The output impedance of the emitter follower transistors 720 and 721 is low so that the change on capacitors 735, 736 and 739 can be changed rapidly. The high input impedance of transistors 720 and 721 prevent loading of the tuned circuits. The base circuit of transistor 720, the control voltage, and the bias voltage are connected in series to avoid losses and delays through shunt paths. The base current required for transistor 743 when conducting is small compared to the collector current. The logic circuitry is designed so that when shifting from SPACE to MARK the potential at the collector of transistor 743 need only change from ground potential to approximately −2 volts. Thus, the control voltage reverses a small amount of current in resistor 741. When shifting back to a SPACE the collector of transistor 743 has to change 18 volts, but at this time the base voltage aids the control voltage in supplying conducting current.

KEYER 600

The keyer 600 provides logical control of the selector magnet within the TTY. Transistor 604 acts as a switch, and transistor 606 functions as a constant current source for the selector magnet.

The logical signals are applied to the base electrode of transistor 604 via the lead KM from the output of the limiter 800. This allows transistor 604 to conduct and become saturated, biasing transistor 606 into the active region. Transistor 606 conducts and functions as a constant current source ($I_c$ equals 60 ma.) for the TTY selector magnet. This produces a MARK condition.

When transistor 604 is cut off due to the input signal on lead KM, transistor 606 is cut off, deenergizing the TTY selector magnet, producing a SPACE condition. Diodes 608 and 610 provides voltage protection and blocking, respectively. Diode 602 aids in cutting off transistor Q1.

RELAY CONTROL CIRCUIT

The relay control circuit 400 comprises the seven relays 410, 420, 440, 460, 470, 480 and 490 for controlling the operation of the various units of the data set. The functions of each of these relays are, briefly:

Relay 410—Ring up—Connected in the full-wave diode bridge 535 to detect the presence of ringing current.

Relay 420—Answer—Operated either by pushbutton 120 of subset 100 or by the relay 410 when a call is received.

Relay 440—Originate—Operated by the pushbutton 110 when a call is to be initiated.

Relay 460—Control—Acts as a partial slave to both relay 420 and 440 relieving these relays of some of their functions.

Relay 470—Transmit mark—Causes a steady MARK tone to be transmitted to the distant station.

Relay 480—Receive mark—Indicates the receipt of a MARK tone from the distant station.

Relay 490—Transmit space—Operated either by pushbutton 150 of the subset 111 or by the receipt of a SPACE tone from the distant station, which in turn causes a SPACE tone to be transmitted to the distant station. Also performs reset functions.

DETAILED DESCRIPTION

*Originating*

A TWX call is initiated by depressing the pushbutton 110 on the subset 100. This momentarily energizes relay 440, which operates and locks itself to ground from its own contacts. This may be traced as follows: ground, break contact 424 of relay 420, lead OCA, make contact 111 of pushbutton 110, lead OCB, winding of relay 440, break contact 494 of relay 490, to battery. Relay 440 in operating locks itself to ground through its own make contact 444. Relay 440 energizes relay 460 by extending ground through make contact 446, break contact 493 of relay 490, winding of relay 460, to battery. Relay 440 in operating also connects filter 5F1 into the send circuit at make contact 447 and filter 5F2 into the receive circuit at make contact 443; at make contact 448 discriminator 700 is made receptive to F2 frequencies by grounding lead DA, the center tap of transformer 711, in the manner previously described; at make contact 452 a circuit is prepared for increasing the inductance in the tuned tank circuit of oscillator 340 to cause it to generate $F1_M$ (1270 c.p.s.).

Relay 460, in operating, establishes a D.C. path through the data set and subset 100 to the telephone line (L1 and L2). This may be traced as follows: line L1, break contact 492 of relay 490, make contact 462 of relay 460, break contact 412 of relay 410, lead L1C, dial contact 132 of dial 130, lead L1D, primary winding 502 of hybrid coil 501 to the line L2. Relay 460 also prepares a circuit from the timer 200 to relay 480. This may be traced as follows: output lead T0 of timer 200, make contact 466 of relay 460, resistance 401, make contact 445 of relay 460 (now operated), break contact 483 of relay 480, winding of relay 480 to battery.

After listening to receiver 140 of the modified handset of the subset 100 and hearing dial tone, dialing may proceed. This will establish the circuit through the various exchanges to the distant station. The called TWX station, either attended, or with automatic answering automatically sends out a MARK tone when the connection is established. This will be on the $F2_M$ frequency (2225 c.p.s.).

The MARK tone is detected at the calling station by the discriminator 700, and the voltage on lead KB changes from 0 to −20 volts. This is as follows: the MARK tone flows over the D.C. path previously described and is induced in the receive winding 504 of the hybrid coil 501, through capacitor 508 to the input of transistor amplifier 510, capacitor 512, resistances 516 and 518 of the receive pad, lead RB, make contact 443 of relay 440, lead F2A, filter 5F2, lead F2B, break contact 426 of relay 420, lead RC to the input of the limiter 800. An amplified signal at the tone frequency appears on the output lead RD and is detected by the discriminator 700 to cause the transistor switch 743 to be rendered non-conductive, all in the manner previously described. With transistor 743 non-conductive, −20 volts is extended through resistor 744 and diode 745, lead KB, break contact 104 of pushbutton 101, to the lead KG. The −20 volts on lead KG is extended to the keyer logic gate and, also, through break contact 488 of relay 480 to the timer control lead TC. This causes the timer 200 to start timing for approximately 750 ms. after which period a ground appears on timer output lead T0, all in the manner previously described. The ground on lead T0, through make contact 466, resistance 401, make contact 445 of relay 440, break contact 483 of relay 480, causes relay 480 to operate its "X" contact 484, and to then operate fully by means of the ground extended through make contact 446 of relay 440, break contact 493 of relay 490, "X" contact 484 of relay 480, make contact 465 of relay 460 to battery of relay 480, indicating the receipt of the MARK tone.

The operation of relay 480 disconnects the receiver 140 at break contact 481; causes the TTY to turn on by extending ground thereto via make contact 485 and lead MSA; and also prepares an operate circuit for relay 490 at make contact 483. The timer control lead TC is switched at make contact 488 so that the timer 200 is now ready to look for a SPACE tone longer than 750 ms. Relay 480 also operates relay 470, which causes a steady MARK tone (1270 c.p.s) to be transmitted to the called station. This may be traced as follows: from ground, make contact 463 of relay 460, make contact 482 of relay 480, winding or relay 470 to battery, causing relay 470 to operate and lock up to the same ground through its "X" contact 471. It may be recalled that when relay 440 operated closing make contact 452 a circuit was prepared to connect coils 351–353 into the tuned tank circuit of oscillator 340. When relay 470 operates to close make contact 475 this path is completed and the oscillator is caused to generate the $F1_M$ MARK tone (1270 c.p.s.), in the manner previously described. The output of oscillator 340 is extended by means of lead SA, break contact 421 of relay 420, lead F1A, filter 5F1, strap 544, lead F1B, make contact 447 of relay 440, lead SB, strap 542, through capacitor 531 to the input of the transistor send amplifier 502 and from its output through capacitor 542, send winding 503 of the hybrid coil 501, capacitor 505 and resistor 506 to ground. The MARK tone signal is induced in the primary winding 502 of the hybrid coil 501 and flows over the D.C. path previously described to the distant station.

The answering station upon receiving the MARK tone starts its TTY, and automatically sends its identification, either letter "V" or DRUM ANSWER-BACK. The operating of an answering station is performing these operations will be described in the text which follows.

After receiving the identification of the answering station transmission and reception of data may commence. This transmission can be by keyboard, or it can be by teletypewriter tape. Normally the message transmitted will appear as page copy on the sending TTY as well as the receiving TTY (half duplex operation), however, by omitting the strap 109 connecting leads KA and KG, full duplex operation is permitted. In this case, both TTY stations can send simultaneously, but the sending station's transmitted message will not appear as page copy.

As long as data is continued to be transmitted and received the data equipment will remain in a seized condition. It may be recalled that the timer 200 is now looking for a SPACE tone. It is true each character is made up of both MARKS and SPACES but the charge on capacitor 838 prevents the timer 200 from operating and timing out.

*Disconnect*

At the end of transmission, clearing or hanging up may be accomplished in one of several ways:

(1) The attendant at the originating station may press pushbutton 150 which is the clear button on the subset 100. In doing so, relay 490 is operated directly, as follows: from ground, make contact 446 of relay 440, lead RS1, make contact 151 of pushbutton 150, lead RS2, to battery of relay 490 causing it to operate. Relay 490 in operating opens the make contact 493 removing the ground holding relays 460 and 480 operated, causing them to restore. Relay 460 in restoring removes the ground holding relay 470 operated and relay 470 restores. Relay 440 is held operated by the −20 battery through resistor 436, and holds the equipment in the proper configuration. Relay 490 in operating the make contact 499 extends +20 volts via lead TSF to the base of transistor 324 causing it to be rendered non-conductive causing the oscillator frequency to shift to send a SPACE tone (1070 c.p.s) to the called station in the manner previously described, and at make contact 496 connects resistor 403 in parallel with resistor 211 to initiate a timing interval of approximately one second. At the end of the one second interval timer 200 in the manner previously described extends a ground via lead T0, break contact 466 of relay 460, resistor 402, make contact 494 of relay 490 to shunt relay 440 thereby causing it to restore. When relay 440 restores the clearing or hanging up is complete.

(2) The attendant at the called station may depress the clear pushbutton 150 on his equipment, causing a SPACE tone (2025 c.p.s.) to be sent to the calling station. The SPACE tone received via the telephone line (L1 and L2) passes through the primary winding 502 of hybrid coil 501, induced in the receive winding 504, capacitor 508, receive amplifier 510, capacitor 512, receive pads (resistors 516 and 518), lead RB, make contact 443 of relay 440, lead F2A, filter 5F2, lead F2B, break contact 426 of relay 420, lead RC, to the input of limiter 800. The SPACE tone signal passes through the limiter 800 and via lead RD to the discriminator 700, detected, to cause the transistor switch 743 to operate, changing the potential on lead KB from 0 to −20 volts, all in the manner previously described. The −20 volts potential on lead KG causes the timer 200 to start a new timing sequency of approximately one second after which time a ground is extended via lead T0, make contact 466 of relay 460, resistor 401, make contact 445 of relay 440, make contact 483 of relay 480, to battery of relay 490, causing it to operate. The disconnect operation after relay 490 operates then proceeds in the manner previously described.

Disconnect operation may also occur when the connecting long distant circuit suddenly goes open. In this instant, the absence of tone is interrupted by the data set equipment as a SPACE tone or SPACE hold and if the absence of tone exists for longer than approximately 750 ms. the timer 200 will time out and operate relay 490, in the manner previously described.

*Answer*

On an incoming call, the local central office sends ringing current, sounding the ringer 145 in the subset 100, and operating relay 410 through the full-wave diode bridge 535. Relay 410 follows the ringing signals and flashes the lamp 123 in the subset 100. This is as follows: from the central office, line L1, break contact 492 of relay 490, break contact 462 of relay 460, lead RUC, capacitor 541, resistor 540, through the full-wave diode bridge 535, line L2, back to the central office; the ringing current is rectified by the full-wave diode bridge 535 and operates relay 410 via leads RUA and RUB. Also, the ringing current on line L1 through break contact 492 of relay 490, break contact 462 of relay 460, lead RUC, ringer 145, capacitor 146, lead L1D, primary winding 502 of hybrid coil 501, to line L2, causes the ringer 145 to sound. Relay 410 in operating closes make contact 411 extending ground through break contact 491 of relay 490, make contact 411 of relay 410, lead AL through lamp 123, resistor 124, to battery, causing lamp 123 to flash.

In an attended station, the attendant on observing the lamp 123 flashing, indicating an incoming call, pushes the answer pushbutton 120 which causes relay 420 to operate. This is as follows: ground, break contact 441 of relay 440, lead ACA, make contact 122 of pushbutton 120, lead ACB through the winding of relay 420, break contact 494 of relay 490 to battery. When automatic answering is provided, relay 410 operates relay 420, as follows: from ground, break contact 485 of relay 480, make contact 413 of relay 410, through the winding of relay 420, break contact 494 of relay 490 to ground.

Relay 420 in operating causes the data set equipment to assume the configuration for the answering mode of operation. Relay 420 in operating at make contact 434 prepares a circuit for connecting coils 351 and 353 of transformer 350 into the tuned tank circuit to cause the oscillator 340 to generate F2 frequencies; at make contacts 428, 492 and 430 aligns the discriminator 700 to detect F1 frequencies; at make contact 421 switches filter 5F1 into the receive circuit; at make contact 426 switches filter 5F2 into the send circuit; and at make contact 425 extends ground through break contact 493 of relay 490 to relay 460 causing it to operate. Relay 460 in operating at make contact 466 prepares an operating path for relay 470 and at make contact 462 prepares a D.C. path through the data set, thus cutting off ringing current, causing relay 410 to restore.

Relay 420 in operating also opens the circuit between leads TD and TDB at break contact 427, causing the timer 200 to start a timing sequence of approximately 1.5 seconds, in the manner previously described. This time interval permits all signalling equipment to get off the line. At the end of this time interval, the timer 200, as previously described, extends ground via lead T0, make contact 466 of relay 460, resistor 401, break contact 445 of relay 440, break contact 472 of relay 470 to battery of relay 470 causing it to operate. Relay 470 in operating at make contact 475 connects coils 351 and 353 of transformer 350 into the tuned tank circuit of oscillator 340 causing a MARK tone (2225 c.p.s.) to be sent via lead SA, break contact 443 of relay 460, lead F2A, filter 5F2, lead F2B, make contact 426 of relay 420, lead SB, strap 542, send amplifier 532, capacitor 542, send winding 503 of hybrid coil 501 and hence the primary winding 502 to the telephone lines L1 and L2; prepares an operating path for relay 480 at make contact 472; and at make contact 473 closes the path between leads TD and TDB. Timer 200 is now waiting for the receipt of a MARK tone (1270 c.p.s.).

The calling station upon receiving the MARK tone (2225 c.p.s.) cuts off its receiver in the handset, starts its TTY, and automatically sends a MARK tone (1270 c.p.s.), all in the manner previously described.

The answering station upon receiving the MARK tone (1270 c.p.s.) starts its TTY and automatically sends its station identification as follows. The signals flowing through the primary winding 502 of the hybrid coil 501 are induced in the receive winding 504, passed through capacitor 508 to the receive amplifier 510, capacitor 512, receive pads (resistors 516 and 518), lead RB, make contact 421 of relay 420, lead F1A, filter 5F1, strap 544, lead F1B, break contact 447, lead RC, capacitor 801 and resistor 802 to the input of the limiter 800. The signal is amplified by the limiter and passed via the lead RD to the discriminator 700 where it is detected, and rectified to operate the transistor switch 743 to change the potential on lead KB from 0 to −20 volts. The output from the discriminator passes via leads KB and KG, break contact 488 of relay 480 to the timer control lead TC. The timer 200, in the manner previously described, extends ground via lead T0, make contact 466 of relay 460, resistor 401, break contact 445 of relay 440, make contact 472 of relay 470, break contact 483 of relay 480 to battery of relay 480, causing it to operate indicating the receipt of a MARK tone.

Relay 480 in operating extends ground via make contact 485 and lead MSA to start the TTY; at make contact 487 extends the ground through make contact 432 of relay 420, make contact 487 and lead ABV to the gate circuit 302, and, if the station is equipped for "V" answering, strap 306 is connected and a positive differentiated pulse is sent via lead TK, break contact 162 of pushbutton 160, lead TL to the base of transistor 324 rendering it nonconductive, thus generating a SPACE, in the manner previously described. After 25 ms. of SPACE (25 ms. of SPACE is equivalent to two SPACE pulses which is the TTY code for "V") transistor 324 is turned on, restoring the MARK condition.

If the station is equipped for Drum Answer-Back, strap 435 is changed to connect the −20 volt potential through the make contact 432 of relay 420, make contact 487 of relay 480 and via lead ABV to the gate circuit 302. The strap 302 is also connected and a pulse is sent via strap 302 and diode 308 to energize the Drum Answer-Back mechanism of the TTY. As the drum rotates the station identification is set back via the send contacts of the TTY.

The receiving station upon receiving the answering station's identification transmits its identification to the answering station and the manner previously described, and the transmission and reception of data may commence.

Upon the completion of transmission of data the data equipment at each of the stations may be restored in the manner previously described.

PUSHBUTTON 101

The pushbutton 101 is a locking type push key which when depressed places the TWX equipment in a local or off-line condition, permitting tape preparation or practice typing. The lamp 106 lights upon depressing the pushbutton 101 and stays lit for the duration of the local operation. By depressing the pushbutton 150 the station is returned to the normal on-hook condition.

The automatic answer feature in the equipment is disabled by the operation of the pushbutton 101 since relay 480 is operated removing the operating ground for relay 420, which is the relay which initiates the answer operation. This is as follows: when pushbutton 101 is depressed ground is extended through break contact 491 of relay 490, lead LD, make contact 103 of pushbutton 101 lead LA, break contact 464 of relay 460 to battery of relay 480 causing it to operate. Relay 480 in operating at break contact 485 removes the ground whereby relay 420 is operated when the "ring-up" relay 410 operates to close make contact 413. Relay 480 in operating also at make contact 485 extends ground via lead MSA to start the TTY, which is used during tape preparation or practice typing.

If the station is called during local operation the ringer will sound and the answer lamp 123 will flash. This is as follows: the ringing current projected over the telephone line (L1 and L2) passes via line L1, make contact 492 of relay 490, break contact 462 of relay 460, lead RUC, capacitor 541, resistor 540 to the full-wave diode bridge 535, to line L2. The rectified ringing current via leads RUA and RUB operates the ring-up relay 410. Relay 410 in operating extends ground via break contact 491 of relay 490, make contact 411 of relay 410, lead AL, to lamp 123 and resistor 124 to —20 volts potential, causing lamp 123 to light. The ringing current also passes via lead RUC through the ringer 145, capacitor 146, lead L1D, primary winding of the hybrid coil 501 to the line L2, causing the ringer 145 to ring.

Operation of the answer pushbutton 120 releases the station from local operation and sets the data equipment up for operation in the "answering mode" since it is mechanically interlocked with the pushbutton 101.

PUSHBUTTON 160

The pushbutton 160 is a locking type push-key which when depressed lights the test lamp 160 by extending ground via make contact 161 through the lamp 164 and resistor 165 to —20 volts potential, and aligns the data equipment for testing locally and from a distant test center. At the termination of testing, the operation of the clear pushbuton 150 restores the equipment to normal on-hook condition.

What is claimed is:

1. A data transmission system for establishing connections between any one of a plurality of stations and for converting direct current signals representative of data to frequency modulated signals representative of said data for transmission over communication channels including a transmission line, said data transmission system comprising in combination:

(a) signal converting means for converting direct current signals representative of data to frequency modulated signals;

(b) coupling means including a differential transformer having a plurality of windings, a first amplifier connected to one of said windings, a second amplifier connected to a second one of said windings, a first plurality of resistance pads connected to said first amplifier, and a second plurality of resistance pads connected to said second amplifier for controlling the signal level of said frequency modulated signals;

(c) limiter means for amplifying and limiting frequency modulated signals;

(d) discriminator means for detecting said amplified and limited frequency modulated signals;

(e) relay means for controlling the operation of each of the above-mentioned means;

(f) timer means operated in conjunction with said relay means for providing a plurality of predetermined different time intervals for operating said relay means at the proper time and in the proper sequence.

2. A data transmission system for establishing connections between any one of a plurality of stations and for converting direct current signals representative of data to frequency modulated signals representative of said data for transmission over communication channels including a transmission line, said data transmission system comprising in combination:

(a) signal converting means for converting direct current signals representative of data to frequency modulated signals;

(b) coupling means for coupling frequency modulated signals to and from said transmission line;

(c) limiter means including a digital, pushpull, complementary-symmetrical amplifier for amplifying and limiting frequency modulated signals;

(d) discriminator means for detecting said amplified and limited frequency modulated signals;

(e) relay means for controlling the operation of each of the above-mentioned means; and (f) timer means operated in conjunction with said relay means for providing a plurality of predetermined different time intervals for operating said relay means at the proper time and in the proper sequence.

References Cited by the Examiner

UNITED STATES PATENTS

| | | | |
|---|---|---|---|
| 2,794,856 | 6/57 | Turner | 178—70 |
| 2,947,814 | 8/60 | Haner | 178—66 |
| 3,046,340 | 7/62 | Stoffels | 178—2 |

OTHER REFERENCES

Basic Electronics, prepared by Bureau of Naval Personnel for Navy Training Courses, NAVPERS 100 87, U.S. Government Printing Office, 1955, pp. 387–388.

Publication: "Radio-Electronics" magazine, December 1957, vol. XXVIII, No. 12, pages 106 and 107.

NEIL C. READ, *Primary Examiner.*